United States Patent
Lebzelter et al.

(10) Patent No.: US 9,231,263 B2
(45) Date of Patent: Jan. 5, 2016

(54) SELECTIVELY REACTING TO THE MINIMUM CELL VOLTAGE DROP RATE IN A FUEL CELL SYSTEM

(71) Applicant: GM GLOBAL TECHNOLOGY OPERATIONS LLC, Detroit, MI (US)

(72) Inventors: Derek R. Lebzelter, Fairport, NY (US); Balasubramanian Lakshmanan, Pittsford, NY (US); Sriram Ganapathy, Honeoye Falls, NY (US); Sanja Sljivar-Lovria, Honeoye Falls, NY (US); Bruce J. Clingerman, North Rose, NY (US); Michael J. Kiefer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/746,227

(22) Filed: Jan. 21, 2013

(65) Prior Publication Data
US 2014/0205924 A1 Jul. 24, 2014

(51) Int. Cl.
  *H01M 8/04* (2006.01)
  *H01M 8/24* (2006.01)
  *H01M 8/10* (2006.01)

(52) U.S. Cl.
  CPC ........ *H01M 8/04559* (2013.01); *H01M 8/0488* (2013.01); *H01M 8/0494* (2013.01); *H01M 2008/1095* (2013.01); *Y02E 60/50* (2013.01)

(58) Field of Classification Search
  CPC ................... H01M 8/04298–8/04313; H01M 8/0444–8/04485; H01M 8/04537–8/04686
  See application file for complete search history.

(56) References Cited

U.S. PATENT DOCUMENTS

| | | | |
|---|---|---|---|
| 6,428,917 B1 | 8/2002 | Lacy et al. | |
| 6,488,837 B1* | 12/2002 | Ren et al. | 205/787 |
| 2002/0021109 A1* | 2/2002 | Marvin et al. | 320/134 |
| 2003/0039869 A1* | 2/2003 | Murakami | H01M 8/04552 429/429 |
| 2004/0058209 A1* | 3/2004 | Benson | C01B 3/32 429/411 |
| 2004/0151956 A1* | 8/2004 | Orihashi et al. | 429/13 |
| 2005/0042485 A1* | 2/2005 | Murayama | H01M 8/04089 429/444 |
| 2005/0123809 A1* | 6/2005 | Saunders et al. | 429/13 |
| 2009/0081491 A1* | 3/2009 | Arthur | H01M 8/04223 429/429 |
| 2009/0197126 A1* | 8/2009 | Ganapathy et al. | 429/13 |
| 2010/0068576 A1 | 3/2010 | Hamada et al. | |
| 2011/0086282 A1* | 4/2011 | Lerner | H01M 8/04223 429/429 |
| 2011/0086283 A1* | 4/2011 | Lerner | H01M 8/04223 429/429 |
| 2011/0115491 A1* | 5/2011 | Jung et al. | 324/431 |
| 2011/0217601 A1* | 9/2011 | Usami | H01M 8/04097 429/410 |

* cited by examiner

*Primary Examiner* — Jonathan Crepeau
*Assistant Examiner* — Jacob Buchanan
(74) *Attorney, Agent, or Firm* — John A. Miller; Miller IP Group, PLC

(57) ABSTRACT

A system and method that monitor the rate of a voltage drop of fuel cells in a fuel cell stack to determine whether the voltage drop is a result of cathode reactant starvation or anode reactant starvation. The method looks at a falling voltage of a fuel cell to determine whether the rate of the fall in voltage indicates that hydrogen starvation of the anode of the fuel cell is occurring. The method also looks at the actual voltage of the fuel cell that is falling to determine whether it is a below a predetermined minimum voltage threshold also indicating that hydrogen starvation of the anode of the fuel cell is occurring. If hydrogen starvation is occurring, the method performs power limiting of the fuel cell stack either based on the rate or the voltage level.

17 Claims, 3 Drawing Sheets

SELECTIVELY REACTING TO THE MINIMUM CELL VOLTAGE DROP RATE IN A FUEL CELL SYSTEM

BACKGROUND OF THE INVENTION

1. Field of the Invention

This invention relates generally to a system and method for determining whether the drop in voltage of a low performing fuel cell in a fuel cell stack is the result of anode reactant starvation and, more particularly, to a system and method for determining whether the drop in voltage of a low performing fuel cell in a fuel cell stack is the result of anode starvation by comparing the rate of the voltage drop to a predetermined threshold.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As a fuel cell stack ages, the performance of the individual cells in the stack degrade differently as a result of various factors. In addition, there are various stack operating conditions that cause the cells to operate differently. There are also various causes of low performing cells, such as cell flooding, loss of catalyst, etc., some temporary and some permanent, some requiring maintenance, and some requiring stack replacement to exchange the low performing cells. For example, if one cell is starved of reactants, especially hydrogen, the voltage for that cell will drop and undesirable side reactions could occur. It is known in the art that a low performing cell can be the result of loss of either or both anode reactants or cathode reactants to the cell, such as, for example, ice buildup in the reactant flow channels. As used herein, anode reactant starvation refers to a lesser amount of hydrogen reaching the cell than is necessary to sustain the drawn current and cathode reactant starvation means a lesser amount of oxygen reaching the fuel cell than is necessary to sustain the drawn current.

Although the fuel cells are electrically coupled in series, the voltage of each cell when a load is coupled across the stack decreases differently where those cells that are low performing have lower voltages. Because all of the fuel cells are electrically coupled in series, if one fuel cell in the stack fails, then the entire stack will fail. Further, since the cells are electrically coupled in series, each cell must produce the full stack current. Thus, it is necessary to separately monitor the voltages of the fuel cells in a stack to ensure that the voltages of the cells do not drop below a predetermined threshold voltage to prevent cell voltage polarity reversal, possibly causing permanent damage to the cell.

Cell voltage monitors or stack health monitors are used to measure the voltage of the fuel cells in the stack to look for behavior in the cells indicative of problems with the stack. The cell voltage monitor generally includes an electrical connection to each bipolar plate, or some number of bipolar plates, in the stack and end plates of the stack to measure a voltage potential between the positive and negative sides of each cell.

If the minimum cell voltage falls below some predetermined minimum cell voltage threshold indicating something is wrong with the cell, such as 300 mV, the system control will likely take some action in an attempt to prevent the minimum cell voltage from falling farther, which could damage the cell. Various remedial actions can be taken, such as providing a more favorable stack humidification, increasing the stack stoichiometry, etc. However, the main remedial action usually taken in response to a significantly low performing cell is to power limit or current limit the stack to prevent significant current draw from the stack. However, power limiting the stack has obvious drawbacks for vehicle operation and driver satisfaction.

It is desirable to limit the amount of catalyst provided on the electrodes in a fuel cell stack because of cost. Because less catalyst is required for the anode side reaction, the anode and cathode electrodes will typically have a different catalyst loading, where the anode catalyst loading, i.e., amount of platinum, is less than the cathode catalyst loading, which results in a different electrode double layer capacitance between the electrodes. The difference in the double layer capacitances causes a different voltage in response to changes in stack current resulting in the cathode voltage falling more slowly than the anode voltage. Typical values for the anode electrode double layer capacitance is in the range of about 1-5

F/cell and for the cathode electrode double layer capacitance is in the range of about 10-40 F/cell. This means that when the cell is totally starved of reactants at a given stack current density, the cathode electrode will change its voltage much slower than the anode electrode.

It is known in the art that a low performing cell as a result of cathode reactant starvation does not harm the stack, but a low performing cell as a result of anode reactant starvation does damage the electrode catalyst resulting in cell damage. If a particular fuel cell is not receiving enough oxygen for the reaction, hydrogen pumping occurs where hydrogen from the anode side is drawn to the cathode side through the cell membrane. However, this reaction does not cause any damage to the cathode electrode. Anode starvation causes a reaction on the anode side that corrodes the carbon support in the catalyst layer of the electrode causing the potential of that electrode to go high relative to the standard hydrogen electrode (SHE), but in an opposite direction than the stack voltage, which can result in a negative cell voltage. Since there is typically less catalyst to lose on the anode and the corrosion effect is a linear one with current density, the loss of catalyst as a result of carbon support damage has a more dramatic impact on the anode side.

The above described phenomenon can be described in more detail as follows. Because electrodes can be starved but still be fed a portion of the stoichiometric reactants, some of the current will be carried by their normal fuel cell reactions, namely, for the anode $H_2 \rightarrow 2H^+ + 2e^-$ and for the cathode $2H^+ + 2e^- + \frac{1}{2}O_2 \rightarrow H_2O$. If the cathode is starved of oxygen, eventually a non-damaging hydrogen pump would be created, where $2H^+ + 2e^- \rightarrow H_2$. If the anode is starved of hydrogen, the current will eventually be taken up by non-damaging oxygen evolution and damaging corrosion of the anode carbon support. The ratio of the two is determined by the anode catalyst and electrode composition and the potential of the electrode, where for the anode $\frac{1}{2}C + H_2O \rightarrow 2H^+ 2e^- + \frac{1}{2}CO_2$ or $H_2O \rightarrow \frac{1}{2}O_2 + 2H^+ + 2e^-$.

SUMMARY OF THE INVENTION

In accordance with the teachings of the present invention, a system and method are disclosed that monitor the rate of a voltage drop of fuel cells in a fuel cell stack to determine whether the voltage drop is a result of cathode reactant starvation or anode reactant starvation. The method includes monitoring the voltage of the fuel cells in the fuel cell stack and determining that the voltage of one or more of the fuel cells is falling over time. The method then looks at the falling voltage of the fuel cell to determine whether the rate of the fall in voltage indicates that hydrogen starvation of the anode of the fuel cell is occurring. The method also looks at the actual voltage of the fuel cell that is falling to determine whether it is a below a predetermined minimum voltage threshold also indicating that hydrogen starvation of the anode of the fuel cell is occurring. If the method determines that the fall in voltage of the fuel cell is a result of hydrogen starvation of the anode of the fuel cell, the method performs power limiting of the fuel cell stack either based on the rate or the voltage level.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a voltage drop of a low performing fuel cell in a fuel cell stack is a result of anode reactant starvation or cathode reactant starvation is merely exemplary in nature, and is in no way intended to limit the invention or its applications or uses. For example, the present invention has particular application for a fuel cell system on a vehicle. However, as well be appreciated by those skilled in the art, the system and method of the invention may have application for other fuel cell systems.

Figure 1:
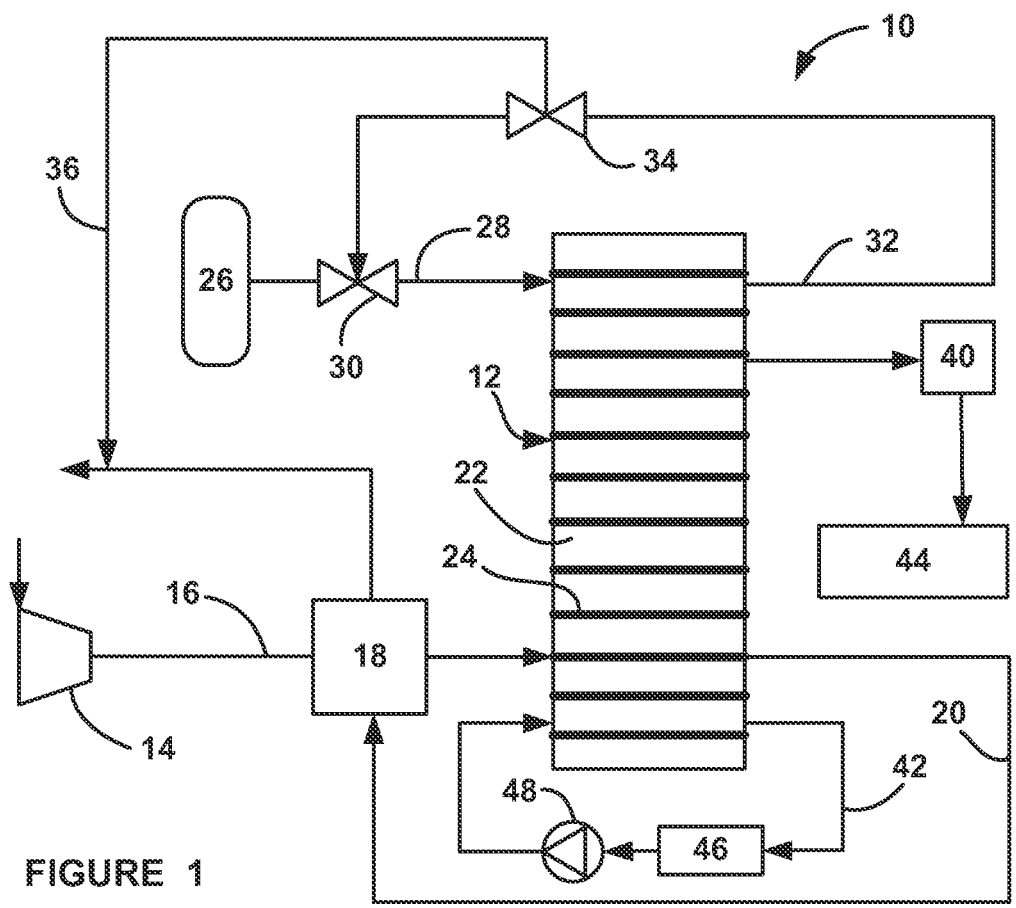
FIG. 1 is a simple block diagram of a fuel cell system.

FIG. 1 is a simple schematic block diagram of a fuel cell system 10 including a fuel cell stack 12 having a series of fuel cells 22. Lines 24 are intended to be a general representation of the anode or cathode electrodes associated with a particular fuel cell 22. A compressor 14 provides airflow to the cathode side of the fuel cell stack 12 on a cathode input line 16 through, for example, a water vapor transfer (WVT) unit 18 that humidifies the cathode input air. A cathode exhaust gas is output from the stack 12 on a cathode exhaust gas line 20, which directs the cathode exhaust to the WVT unit 18 to provide the water content to humidify the cathode input air in a manner that is well understood by those skilled in the art.

The fuel cell stack 12 also receives hydrogen from a hydrogen source 26 that provides hydrogen gas to the anode side of the fuel cell stack 12 on an anode input line 28 by, for example, an injector 30. An anode exhaust gas is output from the fuel cell stack 12 on a recirculation line 32 that recirculates the anode exhaust gas back to the anode input by providing it to the injector 30 that may operate as an injector/ejector, well known to those skilled in the art. One suitable example of an injector/ejector is described in U.S. Pat. No. 7,320,840, entitled "Combination of Injector-Ejector for Fuel Cell Systems," assigned to the assignee of this application and incorporated herein by reference. In an alternate embodiment, the recirculation function of the line 32 could be performed by a pump or compressor instead of an injector/ejector. As is well understood in the art, nitrogen accumulates in the anode side of the stack 12 that reduces the concentration of hydrogen therein, and affects the performance of the system 10. A bleed valve 34 is provided in the recirculation line 32 to periodically bleed the exhaust gas and liquid to remove nitrogen from the anode sub-system. The bled anode exhaust gas is provided on a bleed line 36 to the cathode exhaust line 20. The fuel cell system 10 also includes a cooling fluid flow pump 48 that pumps a cooling fluid through flow channels within the stack 12 and a cooling fluid loop 42 outside of the stack 12. A radiator 46 reduces the temperature of the cooling fluid flowing through the loop 42 in a manner well understood by those skilled in the art.

The system 10 also includes a cell voltage monitor 40 that monitors the voltage of each of the fuel cells 22 within the stack 12. The cell voltage monitor 40 is intended to be a general representation of any suitable cell voltage monitoring circuit or system that provides the various electrical connections, optical connections, etc. between suitable structures or elements within the fuel cell stack 12, such as a physical wire electrically coupled to each bipolar plate separating the fuel cells 27 in the fuel cell stack 12. A controller 44 controls the operation of the system 10 including the compressor 14, the pump 48, the valves 30 and 34, etc., and receives the cell voltage signals from the cell voltage monitor 40.

The present invention proposes a system and method for monitoring the rate of the voltage drop of a low performing cell 22 in the fuel cell stack 12 through the cell voltage monitor 40, and using that rate to determine whether the voltage drop is a result of anode reactant starvation or cathode reactant starvation or partial anode starvation, which would have different implications for remedial actions. As discussed above, because the anode electrode and the cathode electrode typically have a different catalyst loading, where the cathode electrode catalyst loading is significantly higher than the anode electrode catalyst loading, the capacitance of the electrode double layer is significantly higher in the cathode electrode than the anode electrode, which results in a slower rate of change of the voltage in the cathode electrode. Because of this different rate of change of the voltage between the cathode electrode and the anode electrode, the controller 44 can monitor the voltage drop rate to determine whether that voltage drop is a result of effects on the anode, i.e., anode reactant starvation, or effects on the cathode, i.e., cathode reactant starvation.

If the controller 44 determines that the voltage drop is a result of anode reactant starvation, which is more severe, then the controller 44 could power limit the fuel cell stack 12 to prevent cell damage, which would have implications for the vehicle driver. Likewise, if the controller 44 determines that the voltage drop is a result of cathode reactant starvation, which does not have a degrading effect on the cathode electrode, the controller 44 would not limit the power of the stack 12, but may take other less severe remedial actions. Additionally, the controller 44 also looks at the actual voltage of the low performing cell 22 and if that voltage is below some minimum threshold voltage, such as −200 mV, then the controller 44 would power limit in that situation regardless of whether the voltage drop rate of the low performing cell did not indicate anode reactant starvation, which would be partial anode reactant starvation.

When the electrodes 24 are starved of reactants, they either consume no reactant or less reactant than the current requires. If some of the current is provided by the reactants, the deficiency will be made up by current from discharging the cathode double layer or charging the anode double layer. Having reactants take up part of the current means that the voltage decline rate will be lower than it theoretically could be. If a decline in the voltage is faster than what the cathode could produce, but slower than what the anode theoretically could produce, it can be concluded that the decline in the voltage is due to a partially starved anode. If the voltage is declining more slowly than the maximum based on the total cathode starvation, it does not necessarily mean that the cathode is starved of reactants, but the anode could still be starved of reactants, just to a very small extent. Because this starvation is somewhat mild, a power limit response can be postponed until the cell voltage gets low enough where it is clearly identified as anode starvation, such as less than about −200 mV. Even at these fairly low cell voltages, the anode potential is not that high. Typical cathode potentials are 800 mV in these cases so that a −400 mV cell voltage would only mean a maximum anode potential of about 1.2V. At these potentials, the amount of damaging carbon corrosion would be negligible for brief periods.

When the voltage potentials get extreme, additional reactions can start to take up significant amounts of current. When the cathode potential gets below about 100 mV, the hydrogen evolution as a result of the hydrogen pumping reaction can take significant amounts of current. The lowest voltage that would be expected with cathode reactant starvation is about −200 mV, a voltage only seen when the stack 12 is frozen. When the anode potential gets high enough, carbon corrosion and oxygen evolution will significantly begin. This will reduce the voltage decline rate similar to that of the normal fuel cell reactions. By the time the current from carbon corrosion and oxygen evolution become significant, it will be obvious that anode starvation is occurring and the controller 44 can limit the power accordingly.

Figure 2:
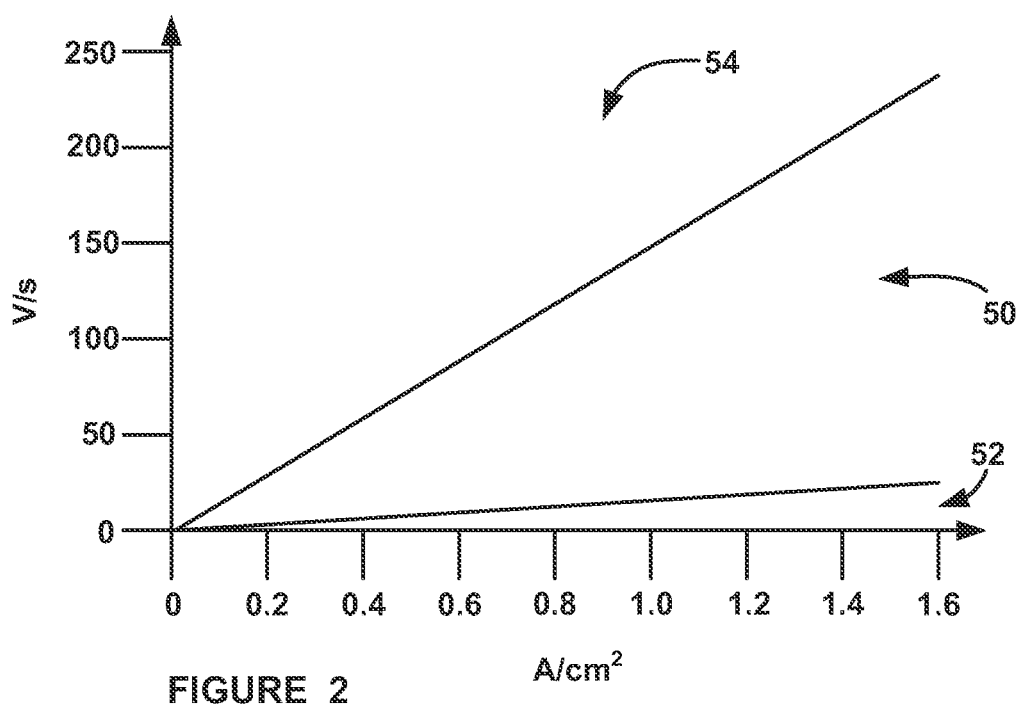
FIG. 2 is a graph with stack current density on the horizontal axis and maximum cell voltage loss possible on the vertical axis showing areas of cell voltage loss as a result of anode reactant starvation or cathode reactant starvation.

The above described relationship is at least partially illustrated in the graph of FIG. 2 where stack current density in A/cm$^2$ is on the horizontal axis and maximum voltage loss possible V/s is on the vertical axis. For a particular stack current density, if the rate of the cell voltage drop is in region 50, then the voltage drop is too fast for the cathode electrode, and it must be anode reactant starvation causing the voltage drop. If the rate of the cell voltage drop is in region 52 for a particular stack current density, then the voltage drop is either caused by cathode reactant starvation or a slow or partial anode reactant starvation, both of which will not have a significant effect on catalyst carbon corrosion before it can be caught by the low threshold criterion. In the region 52 it would not be known whether the current that is generated by the stack 12 is a result of the cathode reaction or a partial anode reaction. Any voltage drop in region 54 is not possible for electrode starvation, and must be some other failure.

Figure 3:
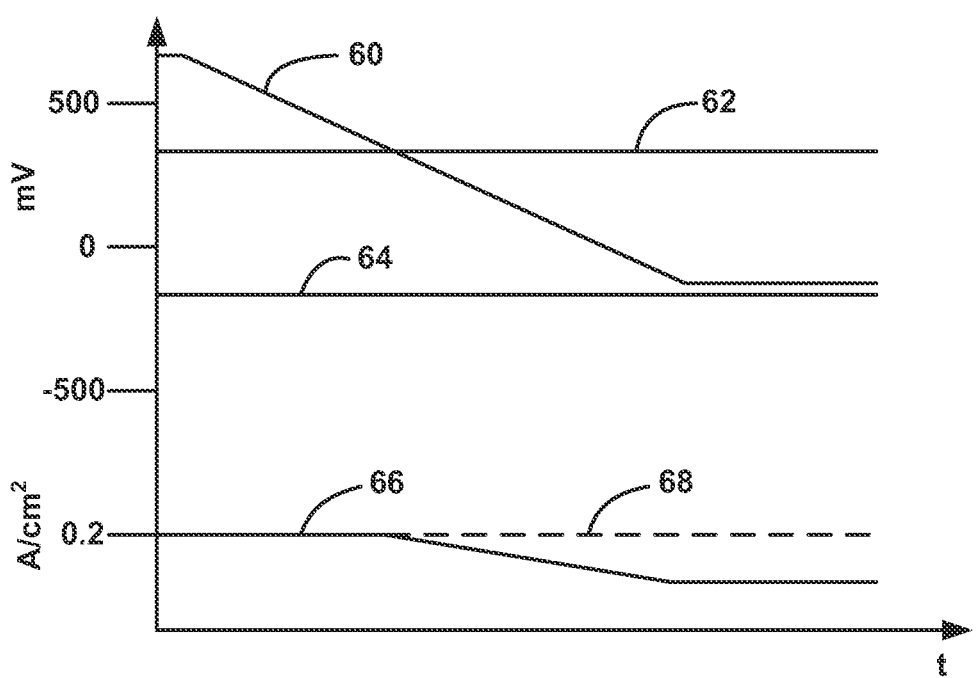
FIG. 3 is a graph with time on the horizontal axis, cell voltage on the vertical axis at the upper part of the graph and stack current density on the vertical axis at the lower part of the graph.

FIG. 3 is a graph with time on the horizontal axis and cell voltage in mV at the top of the vertical axis and stack current density in A/cm$^2$ at the bottom of the vertical axis. Graph line 60 represents a drop in the minimum cell voltage over time that is at a rate where it would be in the region 52 of the graph shown in FIG. 2. Based on that rate, the controller 44 would not know if it was partial anode reactant starvation or cathode reactant starvation as discussed above. Prior to the invention described herein, the controller 44 may have looked at a threshold voltage represented by graph line 62, about 300 mV, and if the cell voltage was below the threshold voltage some remedial action would be taken to prevent the continuation of the drop in cell voltage, such as power limiting. However, actual catalyst corrosion would not occur on the anode electrode as a result of anode reactant starvation until a much lower cell voltage. According to the invention, because the rate of the cell voltage drop is in the region 52 and it is unknown whether it is a cathode reactant starvation or a partial anode reactant starvation, the controller 44 would not perform a drastic remedial action, such as power limiting, until the cell voltage falls below a lower voltage threshold, represented here by graph line 64 at about −200 mV. In this example, the minimum cell voltage does not fall below the threshold at the graph line 64 meaning that the controller 44 would now know that anode reactant starvation was not occurring, but cathode reactant starvation was occurring, and thus no driver-impacting remedial action would be taken in this case.

If the minimum cell voltage continued to fall below the threshold of the graph line 64, then the controller 44 would know that it is a partial anode starvation and the power limiting action would need to be taken at that time. If the rate of drop of the cell voltage was greater to put it in the region 50, then the controller 44 may take the serious remedial action prior to the minimum cell voltage reaching the threshold of the graph line 64. As will be discussed in some detail below, the controller 44 identifies that the cell voltage drop is in the region 50 indicating anode reactant starvation, the controller 44 may provided different levels of power limiting or stack current control based on how close the cell voltage is to the threshold.

Graph line 66 represents the current density of the fuel cell stack 12 if the power limiting was performed when the minimum cell voltage dropped below the threshold of the graph line 62. Graph line 68 shows that the stack current density would not fall for this example because cathode reactant starvation was occurring and power limiting would not be performed.

In one embodiment, the cell voltage measurement will be updated at discrete time intervals. The algorithm will look for voltage delta values, i.e., changes in the voltage, from the previous two voltage measurements for each cell 22 to determine the rate of the voltage decay. If the voltage decay exceeds the cathode starvation threshold, appropriate remedial actions will be taken discussed below. After the cell voltage begins to increase, the voltage drop rate would be reset and the operation would continue as normal.

If the cell voltage monitor 40 sees a falling cell voltage, cathode reactant starvation could be assumed and no power limitation would occur unless it was above the maximum cathode degradation for the current stack density. Once the voltage drops below a minimum threshold, a minimum cell voltage based power limitation as previously was done in the art would be performed. The controller 44 will start limiting the current draw based on the current presently being drawn and will limit the current severely as the voltage reduces below the threshold.

If anode reactant starvation is observed, the algorithm could start limiting current based on what current was previously being drawn from the stack 12. The amount of reduction of the current is based on how quickly the voltage would take to drop below the threshold voltage and cause anode electrode damage. Thus, partial anode reactant starvation at high current density could be power limited more quickly and to a greater extent than total starvation at a low current density. The amount of time before the cell voltage drops below the threshold voltage would be calculated as a gap in the voltage between the present cell voltage and the threshold divided by the current density. If the voltage were projected to fall below the threshold voltage in a short time relative to the sampling rate of the cell voltage monitor 40 if that current was maintained, the power limitation of the stack 12 would be severe. If it would take longer, the power would be limited, but less significantly. This would be a calibration that would greatly depend on the speed of signals and commands going to and from the cell voltage monitor 40 and the controller 44.

One power limitation strategy could be to reduce the stack current by the amount of the current short fall. If total starvation at that current density should produce a −24V/s voltage drop rate, but only a −6V/s is measured, the algorithm would determine that the cell 22 is only 25% starved of reactants. Thus, if the current density was reduced by 25%, the algorithm would expect that sufficient hydrogen is being provided. That feed-forward current limitation may allow stack health preservation while minimizing the impact to the vehicle driver.

The algorithm discussed above provides power limitations in the event that the rate of the fall of the cell voltage is above a predetermined rate, which also has the problem that it affects driving convenience. In an alternate embodiment, it may be desirable to prevent the power limitation even if the anode starvation rate is observed if the actual cell voltage level is above the threshold, such as 200 mV, discussed above where cell damage would not occur. By ignoring the anode starvation at higher cell voltages, the cell will have time to correct an issue before the power is limited.

As soon as the anode is getting enough current from hydrogen oxidation, the rate of voltage decline should go to zero. Once the hydrogen flow rate to the cell is greater than what is consumed, the voltage would increase as hydrogen partial pressure is built and the electric double layer is recharged. If the voltage is above the static threshold when starvation ends and the minimum cell voltage starts to climb, the algorithm would see a positive slope to the minimum cell voltage and the current limit could be increased immediately. Instead, some stabilization period after anode reactant starvation is needed where the current limit is kept constant at its lowest value. This period could be as little 500 ms depending on what data is required. After that, the current limitation would slowly be increased until it was a global maximum. Once there, the anode starvation period will be over and the diagnostic could be reset.

Figure 5:
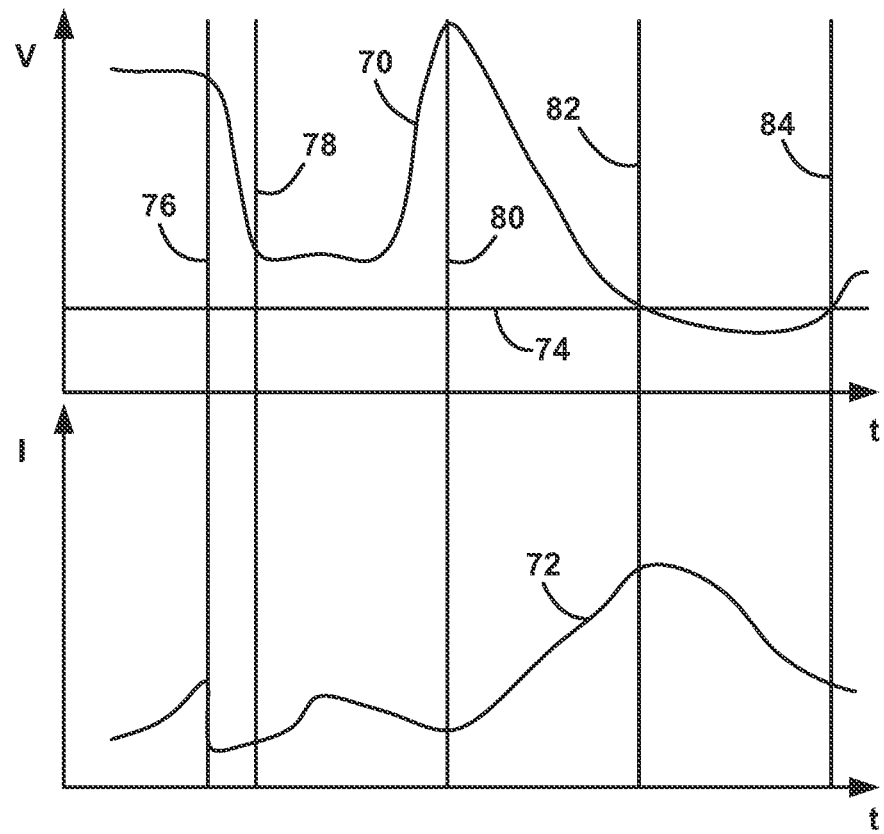
FIG. 5 is a double graph with time on the horizontal axis and current on the lower vertical axis and voltage on the upper vertical axis showing cell voltage and stack current for an anode starvation event.
Figure 4:
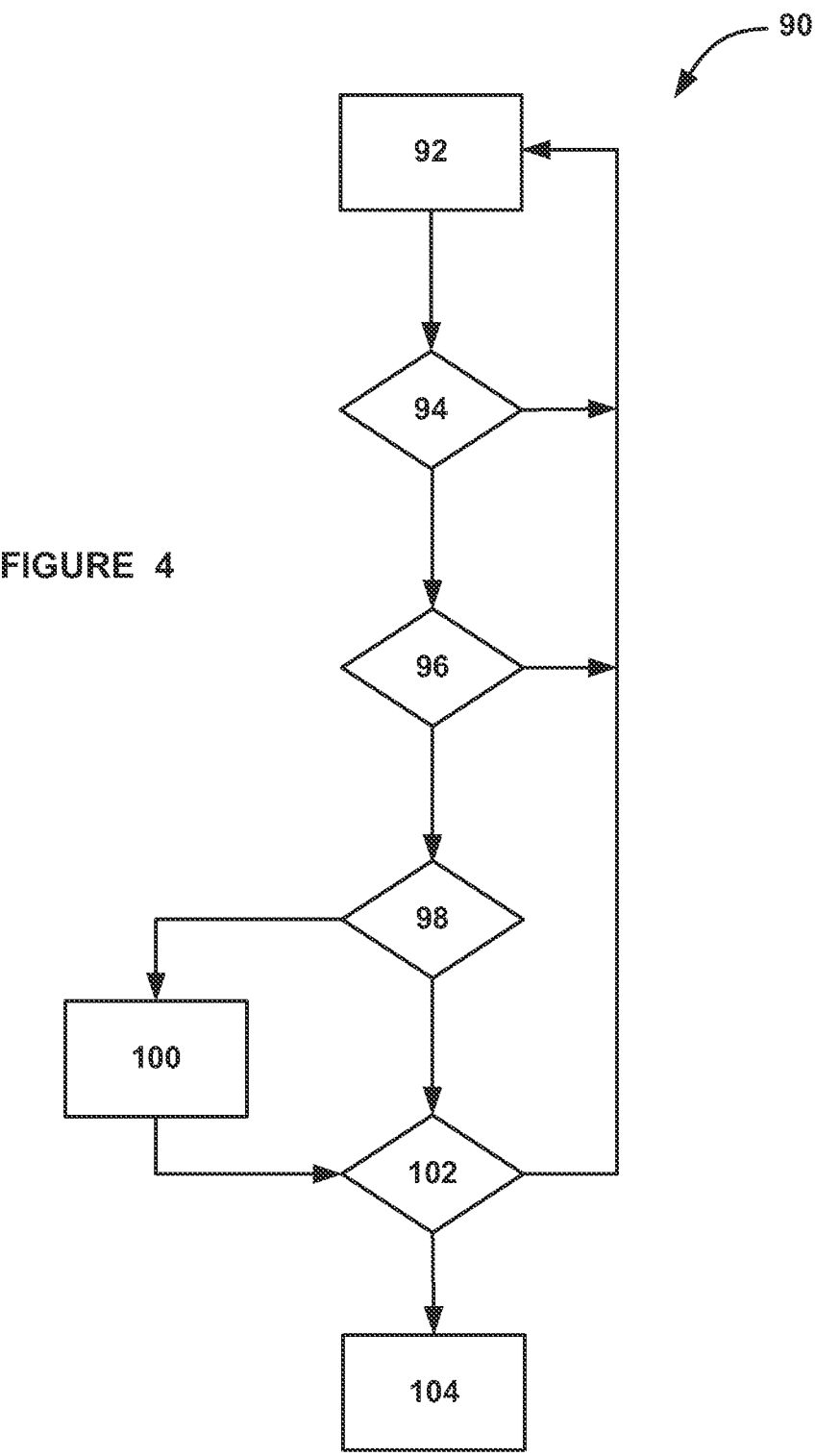
FIG. 4 is a flow chart diagram showing a process for determining whether the minimum cell voltage drop is a result of anode starvation or cathode starvation.

FIG. 4 is a flow chart diagram 90 showing a process for determining whether anode reactant starvation is occurring, and if so, providing power limitations to the stack 12 based on the discussion above. FIG. 5 is a double graph showing stack voltage V relative to time t on the top graph and current I relative to time t on the bottom graph, where graph line 70 is the stack voltage and graph line 72 is the stack current. At box 92, the algorithm measures the cell voltage for the minimum voltage cell 22 and compares it to the last time the cell voltage was measured at a desirable sampling rate to generate a delta value that identifies whether the cell voltage is changing from sample time to sample time, and if so, at what rate. The algorithm looks at the delta value for the minimum voltage cell 22 at decision diamond 94 and determines whether the anode reactant starvation criteria have been met for the cell 22, i.e., whether the delta value is within the region 50.

If the anode reactant starvation criteria have been met at the decision diamond 94, then the algorithm determines if low cell voltage criteria have been met at decision diamond 96. Even though anode starvation is occurring, the algorithm does not take remedial action if the minimum cell voltage is above some relatively high predetermined voltage, such as 400-600 mV, where the minimum cell is not low performing. If the low cell voltage criteria have been met at the decision diamond 96, particularly, the minimum cell voltage is below the predetermined voltage, then the algorithm determines if stack current criteria have been met at decision diamond 98. Because the maximum starvation voltage loss rate is highly dependent on stack current, errors in the stack current can give a "false positive," i.e., identify anode starvation when it is not occurring. To avoid this false positive based on current, the algorithm does not take the remedial action for anode starvation if the current error is greater than a predetermined value, such as 10% of the current measurement. Typically, this is at the low current range since most current sensors have both a linear error that scales with current and an off-set error that does not.

If the rate of change of the cell voltage is in the region 50 and the anode starvation criteria have been met at the decision diamond 94, the cell voltage criteria have been met at the decision diamond 96 and the stack current criteria have been met at the decision diamond 98, then the algorithm proceeds to box 100 to apply a power limitation to the stack 12 as a function of the magnitude of the rate of voltage change that is determined. Particularly, the controller 44 will look at how fast the cell voltage is falling between sample periods, and limit the current output of the stack 12 based on that rate. In the graphs of FIG. 5, line 76 represents one sample time and line 78 represents a next sample time where the minimum cell voltage drop rate between the lines 76 and 78 indicates that the anode starvation criteria has been met.

If the stack current criteria have not been met at the decision diamond 98, then the algorithm determines whether the minimum cell voltage has fallen below a minimum voltage threshold at decision diamond 102, represented by the graph line 64 in FIG. 3 and graph line 74 in FIG. 5. If the minimum cell voltage is not below the threshold at the decision diamond 102, the anode starvation criteria have not been met at the decision diamond 94 and the cell voltage criteria have not been met at the decision diamond 96, then the algorithm returns to the box 92 for the next sample time to determine the voltage delta value for the minimum voltage cell 22. The algorithm also goes to the decision diamond 102 to determine whether the cell voltage is below the threshold once it has applied the current limitation as a function of the magnitude of the voltage rate drop at the box 96. If the minimum cell voltage is below the threshold at the decision diamond 102, then the algorithm provides power limiting at box 104. Line 80 in FIG. 5 represents a sample time where the minimum cell voltage begins to fall, but not at a rate where the anode starvation criteria have been met. At sample time line 82, the minimum cell voltage has fallen below the threshold, where the algorithm proceeds from the decision diamond 98 to the box 100 to limit the stack current based on the minimum cell voltage, which occurs between sample time line 82 and sample time line 84.

The above described anode starvation diagnostic can be enhanced with control for specific situations. In some fuel cell operating conditions, the cell voltage may oscillate up and down as a result of some other non-detrimental effect other than electrode reactant starvation. In this case, the voltage drop that occurs during the oscillation could trigger the diagnostic described above for anode reactant starvation depending on how fast the oscillation was occurring, which would be undesirable. In order to overcome this situation and prevent stack current limitations, the algorithm can be modified to provide a moving window that counts the number of slope changes of the minimum cell voltage. If the number of slope changes is greater than a predetermined value, then the algorithm would determine that the voltage is oscillating and not continuously dropping. If this determination was made, then the algorithm would not limit the current of the stack 12.

Also, as discussed above, depending on the voltage drop rate and the actual cell voltage, significant power limits may be implemented to prevent cell damage. However, the algorithm may not actually know how severe the low voltage problem is. Because limiting the power has a significant impact on vehicle performance, the algorithm may be modified to limit the stack current reduction in stages depending on the response time of the algorithm.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for operating a fuel cell system, said fuel cell system including a fuel cell stack having a plurality of fuel cells electrically coupled in series, said method comprising:
   monitoring a voltage of the fuel cells in the fuel cell stack;
   determining that the voltage of a minimum voltage fuel cell is falling over time;
   determining that the fall in voltage of the minimum voltage fuel cell is a result of hydrogen starvation of an anode of the fuel cell if a rate of the fall in voltage is greater than a predetermined threshold rate;
   determining that the fall in voltage of the minimum voltage fuel cell is a result of hydrogen starvation of the anode of the minimum voltage fuel cell if the voltage of the minimum voltage fuel cell is below a predetermined voltage threshold;
   determining the actual voltage of the minimum voltage fuel cell that is falling over time; and
   power limiting an output of the fuel cell stack if it is determined that the fall in voltage of the minimum voltage fuel cell is a result of hydrogen starvation of the anode of the minimum voltage fuel cell or if the actual voltage is below a predetermined threshold voltage, wherein power limiting the fuel cell stack includes power limiting the stack as a function of a magnitude of the rate of the fall in voltage, and increasing a current limitation after a predetermined hydrogen partial pressure has built and a predetermined stabilization period has been achieved.

2. The method according to claim 1 wherein power limiting the fuel cell stack includes limiting a current output of the fuel cell stack based on an amount of reactant short-fall determined by a difference in an observed voltage drop rate and a possible maximum voltage drop rate.

3. The method according to claim 1 wherein power limiting the fuel cell stack includes power limiting the fuel cell stack in discrete steps where determining that hydrogen starvation is occurring is performed between each power limiting step.

4. The method according to claim 1 further comprising determining that the fall in voltage of the minimum voltage fuel cell is a result of a voltage oscillation and not a result of hydrogen starvation, and preventing power limiting of the fuel cell stack if it is determined that the voltage drop is a result of the voltage oscillation.

5. The method according to claim 1 wherein determining that the fall in voltage of the minimum voltage fuel cell is a result of hydrogen starvation is determined based on a catalyst loading of an anode electrode and a cathode electrode in the minimum voltage fuel cell where the anode electrode catalyst loading allows a higher fall and rate of fall in voltage than the cathode electrode catalyst loading.

6. The method according to claim 1 wherein the predetermined voltage threshold is about −200 mV.

7. The method according to claim 1 wherein monitoring the voltage of the fuel cells in the fuel cell stack includes monitoring the voltage of the fuel cells in the fuel cell stack at discrete sample times to generate a delta voltage for the minimum voltage fuel cell from one sample time to a next sample time.

8. A method for operating a fuel cell system, said fuel cell system including a fuel cell stack having a plurality of fuel cells electrically coupled in series, said method comprising:
monitoring a voltage of the fuel cells in the fuel cell stack;
determining that the voltage of a minimum voltage fuel cell is falling over time;
determining that the fall in voltage of the minimum voltage fuel cell is a result of hydrogen starvation of an anode of the minimum voltage fuel cell if a rate of the fall in voltage is greater than a predetermined threshold rate;
determining the actual voltage of the minimum voltage fuel cell that is falling over time; and
power limiting an output of the fuel cell stack if it is determined that the fall in voltage of the minimum voltage fuel cell is a result of hydrogen starvation of the anode of the minimum voltage fuel cell or if the actual voltage is below a predetermined threshold voltage, wherein power limiting the fuel cell stack includes power limiting the stack as a function of a magnitude of the rate of the fall in voltage, and increasing a current limitation after a predetermined hydrogen partial pressure has built and a predetermined stabilization period has been achieved.

9. The method according to claim 8 wherein power limiting the fuel cell stack includes limiting a current output of the fuel cell based on an amount of reactant short-fall determined by a difference in an observed voltage drop rate and a possible maximum voltage drop rate.

10. The method according to claim 8 wherein power limiting the fuel cell stack includes power limiting the fuel cell stack in discrete steps where determining that hydrogen starvation is occurring is performed between each power limiting step.

11. The method according to claim 8 further comprising determining that the fall in voltage of the minimum voltage fuel cell is a result of a voltage oscillation and not a result of hydrogen starvation, and preventing power limiting of the fuel cell stack if it is determined that the voltage drop is a result of the voltage oscillation.

12. The method according to claim 8 wherein determining that the fall in voltage of the minimum voltage fuel cell is a result of hydrogen starvation is determined based on a catalyst loading of an anode electrode and a cathode electrode in the fuel cell where the anode electrode catalyst loading allows a higher fall and rate of fall in voltage than the cathode electrode catalyst loading.

13. The method according to claim 8 wherein monitoring the voltage of the fuel cells in the fuel cell stack includes monitoring the voltage of the fuel cells in the fuel cell stack at discrete sample times to generate a delta voltage for the minimum voltage fuel cell from one sample time to a next sample time.

14. A fuel cell system including a fuel cell stack having a plurality of fuel cells electrically coupled in series, said system comprising:
means for monitoring a voltage of the fuel cells in the fuel cell stack;
means for determining that the voltage of a minimum voltage fuel cell is falling over time;
means for determining that the fall in voltage of the minimum voltage fuel cell is a result of hydrogen starvation of an anode of the minimum voltage fuel cell if a rate of the fall in voltage is greater than a predetermined threshold rate;
means for determining that the fall in voltage of the minimum voltage fuel cell is a result of hydrogen starvation of the anode of the minimum voltage fuel cell if the voltage of the minimum voltage fuel cell is below a predetermined voltage threshold;
means for determining the actual voltage of the minimum voltage fuel cell that is falling over time; and
means for power limiting an output of the fuel cell stack if it is determined that the fall in voltage of the minimum voltage fuel cell is a result of hydrogen starvation of the anode of the minimum voltage fuel cell or if the actual voltage is below a predetermined threshold voltage, wherein the means for power limiting the fuel cell stack power limits the stack as a function of a magnitude of the rate of the fall in voltage, and increasing a current limitation after a predetermined hydrogen partial pressure has built and a predetermined stabilization period has been achieved.

15. The system according to claim 14 wherein the means for power limiting the fuel cell stack limits a current output of the fuel cell stack based on an amount of reactant short-fall determined by a difference in an observed voltage drop rate and a possible maximum voltage drop rate.

16. The system according to claim 14 wherein the means for power limiting the fuel cell stack power limits the fuel cell stack in discrete steps where determining that hydrogen starvation is occurring is performed between each power limiting step.

17. The system according to claim 14 further comprising means for determining that the fall in voltage of the minimum voltage fuel cell is a result of a voltage oscillation and not a result of hydrogen starvation, and preventing power limiting of the fuel cell stack if it is determined that the voltage drop is a result of the voltage oscillation.

* * * * *